US012812285B2

(12) United States Patent
Zeng et al.

(10) Patent No.: US 12,812,285 B2
(45) Date of Patent: Nov. 24, 2026

(54) METHOD FOR CONTROLLING HEADPHONE MODE, HEADPHONE DEVICE, HEAD-MOUNTED DEVICE AND STORAGE MEDIUM

(71) Applicant: GOERTEK INC., Weifang (CN)

(72) Inventors: Kai Zeng, Weifang (CN); Dongmei Ma, Weifang (CN)

(73) Assignee: GOERTEK INC., Weifang (CN)

( * ) Notice: Subject to any disclaimer, the term of this patent is extended or adjusted under 35 U.S.C. 154(b) by 230 days.

(21) Appl. No.: 18/810,700

(22) Filed: Aug. 21, 2024

(65) Prior Publication Data

US 2024/0414466 A1 Dec. 12, 2024

Related U.S. Application Data

(63) Continuation of application No. PCT/CN2022/102142, filed on Jun. 29, 2022.

(30) Foreign Application Priority Data

May 26, 2022 (CN) ......................... 202210582698.7

(51) Int. Cl.
*H04R 1/10* (2026.01)
*G06F 3/16* (2006.01)
(Continued)

(52) U.S. Cl.
CPC ........... *H04R 1/1041* (2013.01); *G06F 3/167* (2013.01); *G06V 20/50* (2022.01); *G06V 40/171* (2022.01); *G10L 17/06* (2013.01)

(58) Field of Classification Search
CPC ......... G10K 11/17827; G10K 11/1783; G10K 11/17837; G10K 11/17885; H04R 1/1041;
(Continued)

(56) References Cited

U.S. PATENT DOCUMENTS 10,129,633 B1 * 11/2018 Patil ................. G08B 13/19663
2016/0026871 A1 * 1/2016 Wexler .................. G01S 3/7864
382/103

(Continued)

FOREIGN PATENT DOCUMENTS

CN 105632049 A 6/2016
CN 106095408 A 11/2016

(Continued)

OTHER PUBLICATIONS

First Office Action in Corresponding Chinese Application No. 202210582698.7, dated Mar. 16, 2023; 18 pgs.

(Continued)

*Primary Examiner* — Jason R Kurr
(74) *Attorney, Agent, or Firm* — HAUPTMAN HAM, LLP

(57) ABSTRACT

Disclosed are a method for controlling a headphone mode, a headphone device, a head-mounted device and a storage medium. The method for controlling the headphone mode includes the following steps: receiving image data sent by a head-mounted device, where the head-mounted device is configured to obtain the image data by capturing external environment by an image sensor on the head-mounted device; analyzing the received image data, and detecting whether the external environment meets a first target condition, where the first target condition is that a target object exists in the external environment or that the target object in a target state exists in the external environment; and in response to determining that the external environment meets the first target condition, turning on a transparent mode.

6 Claims, 5 Drawing Sheets

(51) Int. Cl.

| | |
|---|---|
| ***G06V 20/50*** | (2022.01) |
| ***G06V 40/16*** | (2022.01) |
| *G10L 17/06* | (2013.01) |

(58) Field of Classification Search
CPC ...... G06V 40/171; G06V 20/50; G10L 17/06; G10L 15/24; G06F 3/167
See application file for complete search history.

(56) References Cited

U.S. PATENT DOCUMENTS

| | | | | |
|---|---|---|---|---|
| 2016/0034251 | A1 | 2/2016 | Sendai et al. | |
| 2016/0070343 | A1 | 3/2016 | Li | |
| 2022/0256278 | A1* | 8/2022 | Usher | H04R 1/1041 |
| 2023/0062598 | A1* | 3/2023 | Nathan | H04R 1/08 |
| 2024/0205614 | A1* | 6/2024 | Wexler | H04R 25/407 |

FOREIGN PATENT DOCUMENTS

| | | | |
|---|---|---|---|
| CN | 109451390 | A | 3/2019 |
| CN | 111741396 | A | 10/2020 |
| CN | 112019960 | A | 12/2020 |
| CN | 112383857 | A | 2/2021 |
| CN | 112698892 | A | 4/2021 |
| CN | 113542963 | A | 10/2021 |
| CN | 113630680 | A | 11/2021 |

OTHER PUBLICATIONS

Grant Notification in Corresponding Chinese Application No. 202210582698.7, dated Dec. 31, 2023; 3 pgs.
International Search Report and Written Opinion in Corresponding International Application No. PCT/CN2022/102142, mailed Dec. 19, 2022; 11 pgs.
Second Office Action in Corresponding Chinese Application No. 202210582698.7, dated Apr. 29, 2023; 19 pgs.

* cited by examiner

METHOD FOR CONTROLLING HEADPHONE MODE, HEADPHONE DEVICE, HEAD-MOUNTED DEVICE AND STORAGE MEDIUM

CROSS-REFERENCE TO RELATED APPLICATIONS

This application is a continuation application of International Application No. PCT/CN2022/102142, filed on Jun. 29, 2022, which claims priority to Chinese Patent Application No. 202210582698.7, filed on May 26, 2022. The disclosures of the above-mentioned applications are incorporated herein by reference in their entireties.

TECHNICAL FIELD

The present application relates to the technical field of headphone, and in particular to a method for controlling a headphone mode, a headphone device, a head-mounted device and a storage medium.

BACKGROUND

With the development of science and technology, head-mounted devices such as virtual reality devices and augmented reality devices have gradually entered people's lives. When a user uses a head-mounted device, it is usually used together with a headphone device. Since the headphone device is well sealed, when the external environment changes or someone in the external environment communicates with the user, the user cannot hear the sound of the external environment, which affects the comfort and convenience of the user in using the head-mounted device.

The above content is only used to assist in understanding the technical solution of the present application, and does not mean that the above content is recognized as prior art.

SUMMARY

The main purpose of the present application is to provide a method for controlling a headphone mode, a headphone device, a head-mounted device and a storage medium, aiming to solve the technical problem that when a user uses a head-mounted device normally, the user cannot hear the sound of the external environment, resulting in poor comfort and convenience for the user to use the head-mounted device.

To achieve the above purpose, the present application provides a method for controlling a headphone mode, which is applied to a headphone device, and the method includes:

- receiving image data sent by a head-mounted device, where the head-mounted device is configured to obtain the image data by capturing external environment by an image sensor on the head-mounted device;
- analyzing the image data, and detecting whether the external environment meets a first target condition; where the first target condition is that a target object exists in the external environment or that the target object in a target state exists in the external environment; and
- in response to determining that the external environment meets the first target condition, turning on a transparent mode.

In an embodiment, in response to that the first target condition is that the target object in the target state exists in the external environment, and the target object is a person, the analyzing the image data, and detecting whether the external environment meets the first target condition includes:

- analyzing the image data, and detecting whether the target object exists in the external environment;
- in response to determining that the target object exists in the external environment, detecting whether the target object is in the target state; where the target state includes an approaching state, a moving state and/or a sound-producing state, and the approaching state is a state in which a distance between the target object and an user is within a preset distance range; and
- in response to determining that the target object is in the target state, determining that the external environment meets the first target condition.

In an embodiment, the detecting whether the target object is in the sound-producing state includes:

- obtaining lip data of the target object obtained by analyzing the image data, where the lip data includes lip contour data and lip opening degree and closing degree data;
- comparing the lip data with preset reference data; where the reference data includes lip contour data of a person when not in the sound-producing state, and lip opening degree and closing degree data of the person when not in the sound-producing state; and
- in response to determining that the lip data is inconsistent with the reference data, determining that the target object is in the sound-producing state.

In an embodiment, after the in response to determining that the external environment meets the first target condition, turning on the transparent mode, the method further includes:

- obtaining an external sound signal by a feedforward microphone of the headphone device, and detecting whether the external sound signal meets a second target condition; where the second target condition is that a voiceprint of the external sound signal matches a preset voiceprint and/or voice information in the external sound signal matches preset keyword information;
- in response to that the external sound signal meets the second target condition, continuously turning on the transparent mode; and
- in response to that the external sound signal does not meet the second target condition, turning off the transparent mode and sending a prompt message to the head-mounted device; where the prompt message is configured to prompt the head-mounted device to capture the external environment by the image sensor to obtain image data and feed the external environment back to the headphone device.

In an embodiment, after the in response to that the external sound signal meets the second target condition, continuously turning on the transparent mode, the method further includes:

- detecting whether continuous duration that the headphone device turns on the transparent mode reaches a preset duration; and
- in response to determining that the continuous duration reaches the preset duration, obtaining the external sound signal by the feedforward microphone of the headphone device, and detecting whether the external sound signal meets the second target condition.

In an embodiment, the present application further provides a method for controlling a headphone mode applied to a head-mounted device, an image sensor is provided on the head-mounted device, and the method includes:

capturing external environment by using the image sensor to obtain image data;

analyzing the image data, and detecting whether the external environment meets a target condition; where the target condition is that a target object exists in the external environment or that the target object in a target state exists in the external environment; and in response to determining that the external environment meets the target condition, sending a first prompt message to a headphone device, where the first prompt message is configured to prompt the headphone device to turn on a transparent mode.

In an embodiment, before capturing the external environment by using the image sensor to obtain the image data, the method further includes:

receiving a second prompt message sent by the headphone device; where the second prompt message is sent by the headphone device to the head-mounted device, and is configured to prompt the head-mounted device to execute the capturing the external environment by using the image sensor to obtain the image data.

To achieve the above purpose, the present application further provides a headphone device, including: a memory, a processor, and a program for controlling a headphone mode stored in the memory and executable on the processor, and the program for controlling the headphone mode is configured to implement the method for controlling the headphone mode as described above.

To achieve the above purpose, the present application further provides a head-mounted device, including: a memory, a processor, and a program for controlling a headphone mode stored in the memory and executable on the processor, and the program for controlling the headphone mode is configured to implement the method for controlling the headphone mode as described above.

In addition, to achieve the above-mentioned purpose, the present application further proposes a computer-readable storage medium, the storage medium stores a program for controlling a headphone mode, and the program for controlling the headphone mode implements the method for controlling the headphone mode described above when executed by a processor.

In the present application, the headphone device receives image data sent by the head-mounted device, where the head-mounted device captures the external environment by the image sensor on the head-mounted device to obtain image data; the headphone device analyzes the received image data, detects whether the external environment meets the target condition, where the target condition is that a target object exists in the external environment or that a target object in a target state exists in the external environment; when determining that the external environment meets the target condition, the headphone device turns on the transparent mode. The present application realizes that enabling a user to hear the sounds of external environment when using a head-mounted device normally, thereby improving the comfort and convenience of the user when using the head-mounted device.

The realization of the purpose, functional features and advantages of the present application will be further explained in conjunction with the embodiments and with reference to the drawings.

DETAILED DESCRIPTION OF THE EMBODIMENTS

It should be understood that the specific embodiments described herein are only used to explain the present application and are not used to limit the present application.

Figure 1:
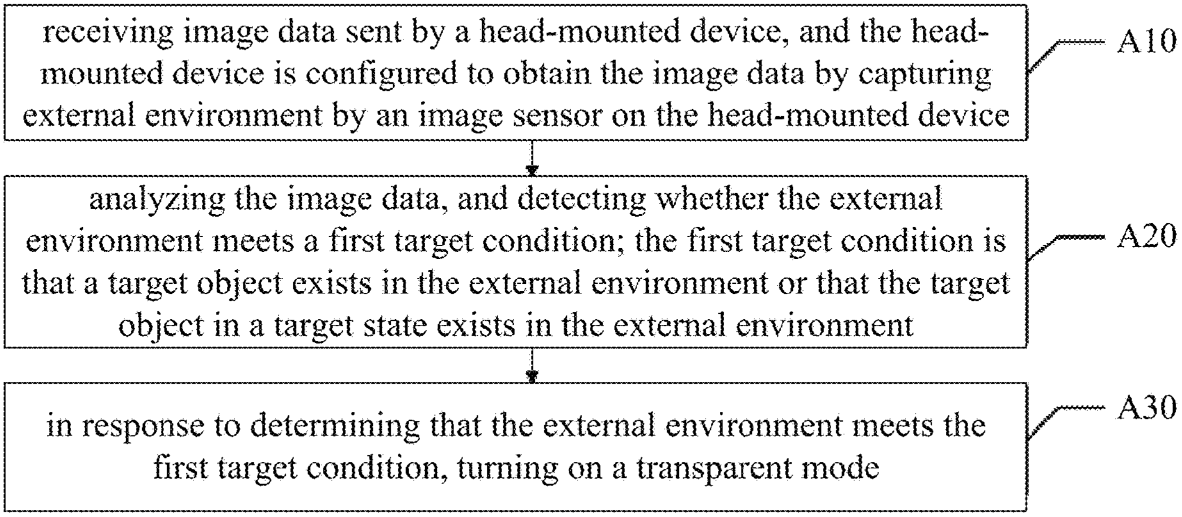
FIG. 1 is a flowchart of a method for controlling a headphone mode according to an embodiment of the present application.

The embodiment of the present application provides a method for controlling a headphone mode, referring to FIG. 1, which is a flowchart of a method for controlling a headphone mode according to an embodiment of the present application. It should be noted that although the logical sequence is shown in the flowchart, in some cases, the steps shown or described can be performed in a different order from that here. The method for controlling the headphone mode of the embodiment of the present application is applied to a headphone device, and the headphone device can be a head-mounted device, an ear-hook headphone device, an in-ear headphone device, etc., which is not limited in this embodiment. In this embodiment, the method for controlling the headphone mode includes:

Step A10, receiving image data sent by a head-mounted device, and the head-mounted device is configured to obtain the image data by capturing external environment by an image sensor on the head-mounted device.

In this embodiment, in order to solve the problem that the user cannot hear the sound of the external environment when using the head-mounted device normally, resulting in poor comfort and convenience for the user to use the head-mounted device, a method for controlling a headphone mode is proposed, which intelligently controls the transparent mode of the headphone device to turn on and off, so that the user can hear the sound of the external environment when using the head-mounted device normally, thereby improving the comfort and convenience of the user when using the head-mounted device.

Specifically, in this embodiment, the headphone device communicates with the head-mounted device, the head-mounted device captures the external environment by the image sensor provided on the head-mounted device to obtain image data of the external environment, and the head-mounted device sends the image data to the headphone device. The headphone device receives the image data sent by the head-mounted device, detects the external environment according to the image data, and the headphone device determines whether to turn on the transparent mode according to the detection result.

Step A20, analyzing the image data, and detecting whether the external environment meets a first target condition; the first target condition is that a target object exists in the external environment or that the target object in a target state exists in the external environment.

In this embodiment, the condition for turning on the transparent mode (hereinafter referred to as the first target condition for distinction) is pre-set on the headphone device aiming at the external environment. The headphone device analyzes the received image data, and detect whether the external environment meets the first target condition.

The first target condition can be set according to demand. For example, in an embodiment, the first target condition may be that a target object exists in the external environment, and the target object may be a person in the external environment or an object in the external environment, and there is no specific limitation. For another example, in another embodiment, the first target condition may be that the target object in a target state exists in the external environment, and the target state may be set as needed. Aiming at the first target condition, one target state may be set, or multiple target states may be set. Furthermore, in an embodiment, when setting multiple target states aiming at the first target condition, the first target condition may be that the target object in all target states at the same time exists in the external environment, or may be that the target object in any target state exists in the external environment. The target states pre-set for aiming at different types of target objects may be the same or different; the target states pre-set for aiming at the same type of target object may also have multiple states, which is not specifically limited in this embodiment.

Step A30, in response to determining that the external environment meets the first target condition, turning on a transparent mode.

According to the result obtained by the headphone device analyzing the image data, when determining that the external environment meets the preset first target condition, the headphone device turns on the transparent mode. Turning on the transparent mode can specifically be turning off active noise reduction and performing gain processing on human voice. After turning off the active noise reduction, the headphone device does not perform noise reduction processing on the external sound signal picked up by the headphone device, so that the user can hear the sound of the external environment, and at the same time performing gain processing on the human voice, so that the user can hear the human voice in the external environment more clearly.

Furthermore, in an embodiment, when determining that the external environment does not meet the preset first target condition, the headphone device does not turn on the transparent mode. The headphone device continues to receive the image data sent by the head-mounted device, and analyzes the received image data.

It should be noted that after the headphone device turns on the transparent mode, it allows users to hear human voices and other sounds in the external environment without stopping the use of headphone devices or head-mounted devices, thus improving the comfort and convenience of users using head-mounted devices.

In this embodiment, the headphone device receives the image data sent by the head-mounted device, the headphone device analyzes the received image data, detects whether the external environment meets the first target condition, and turns on the transparent mode when determining that the external environment meets the first target condition, realizing that the user can hear the sound of the external environment in the case of using the headphone device and the head-mounted device normally, and improving the comfort and convenience of the user when using the head-mounted device normally.

Figure 4:
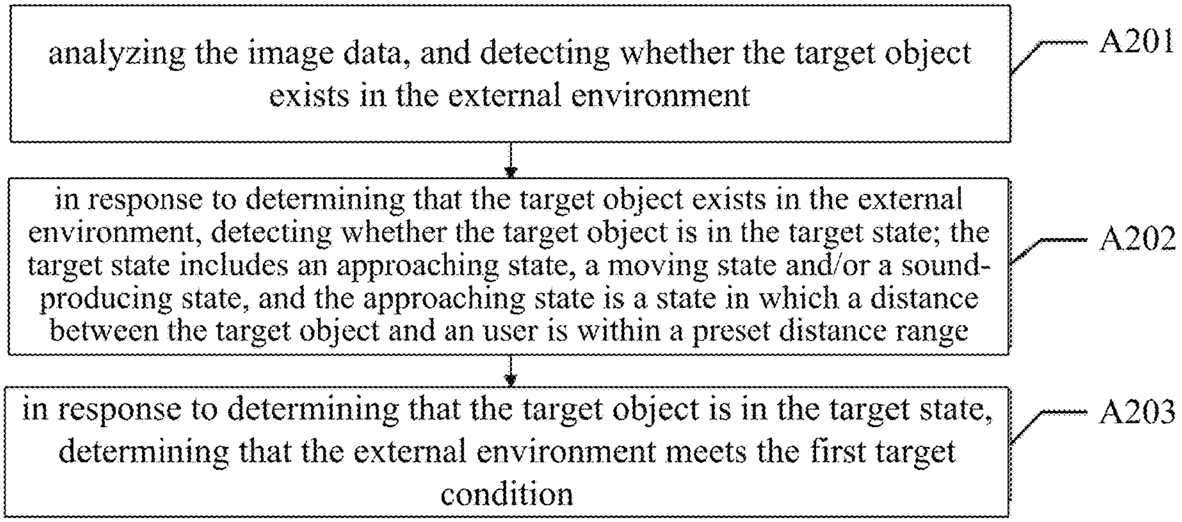
FIG. 4 is a flowchart of a method for controlling a headphone mode according to an embodiment of the present application.

Furthermore, based on the above embodiment, referring to FIG. 4, another embodiment of the method for controlling the headphone mode of the present application is proposed. In this embodiment, the first target condition is that the target object in the target state exists in the external environment, the target object is a person, and the step A20 includes:

Step A201, analyzing the image data, and detecting whether the target object exists in the external environment.

In this embodiment, the first target condition may be that a target object in a target state exists in the external environment, and the target object may be a person in the external environment.

Furthermore, in this embodiment, the headphone device detects the received image data, and determining whether a target object exists in the external environment. The method for determining whether the target object exists in the external environment can be processed with reference to the existing object recognition technology, which is not specifically limited in this embodiment.

Step A202, in response to determining that the target object exists in the external environment, detecting whether the target object is in the target state; the target state includes an approaching state, a moving state and/or a sound-producing state, and the approaching state is a state in which a distance between the target object and an user is within a preset distance range.

When determining that the target object exists in the external environment, the headphone device analyzes the image data, and detect whether the target object is in a target state.

The target state set for aiming at the target object may include one state or may include multiple different states. In an embodiment, the target state may be a state in which the target object moves in the external environment, that is, the moving state. In another embodiment, the target state may be a state in which the target object speaks in the external environment, that is, the sound-producing state. In another embodiment, the target state may be a state in which the distance between the target object and the user is within a preset distance range, that is, an approaching state. In another embodiment, the target state may also be any of the three states mentioned above or other states of the target object, which may be set according to actual needs and is not limited here.

Step A203, in response to determining that the target object is in the target state, determining that the external environment meets the first target condition.

When the headphone device determines that the target object is in the target state, it can be determined that the external environment meets the first target condition, and the headphone device turns on the transparent mode.

Furthermore, in another embodiment, when the headphone device determines that the target object is not in the target state, it can be determined that the external environment does not meet the first target condition, at this time, the headphone device does not turn on the transparent mode.

Furthermore, in another embodiment, the first target condition may be that a target object in a target state exists in the external environment, and the target object may be an object in the external environment. The headphone device detects the received image data, and when the headphone device determines that the target object exists in the external environment, detecting the state of the target object, and determining whether the target object is in the target state.

In a specific embodiment, the target state can be a moving state, or can be an approaching state, or can be a state in which the indicator light of the target object flashes, that is, an indicator state, or can further be any of the above three states or other states of the target object, which may be set according to actual needs and are not limited here.

When the headphone device determines that the target object is in the target state, at this time, it can be determined that the external environment meets the first target condition, and the headphone device turns on the transparent mode.

It should be noted that setting the target object in the target state as the first target condition. When determining that the external environment meets the first target condition, the headphone device turns on the transparent mode, which can avoid the user from hearing unnecessary sounds in the external environment and improve the comfort of the user using the head-mounted device.

Furthermore, in another embodiment, the first target condition may be that the target object exists in the external environment, and the target object may be a person and/or object in the external environment. The headphone device detects the received image data. When the headphone device determines that the target object exists in the external environment, it can be determined that the external environment meets the first target condition, and the headphone device turns on the transparent mode.

It should be noted that setting that the target object exists in the external environment as the first target condition. When the external environment meets the first target condition, the headphone device turns on the transparent mode, thus enabling the user to hear as much sound of the external environment as possible when using the head-mounted device normally, and improving the convenience of the user in using the head-mounted device.

Figure 5:
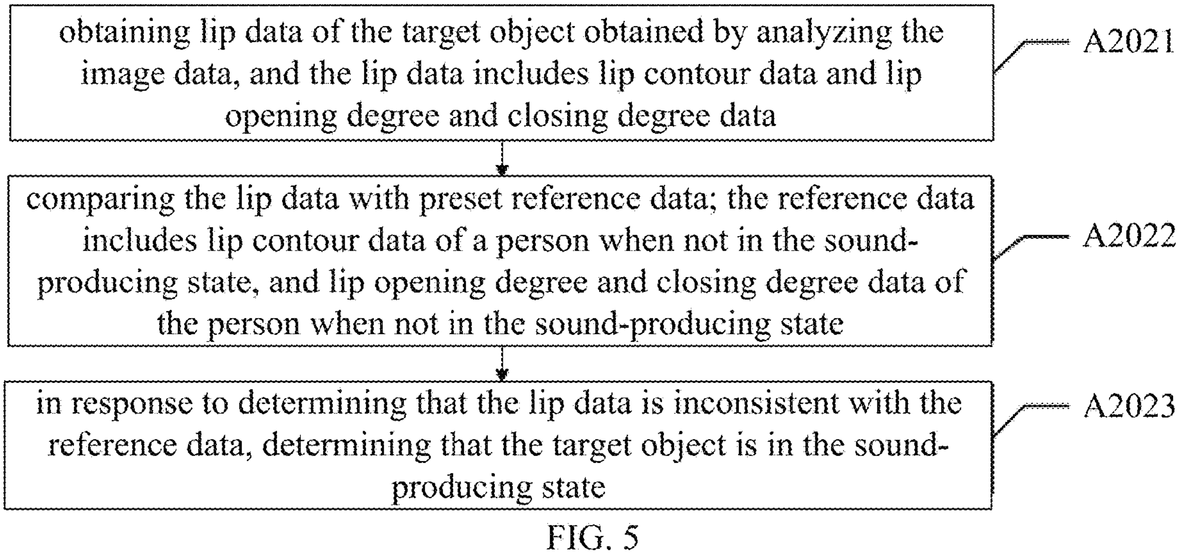
FIG. 5 is a flowchart of a method for controlling a headphone mode according to an embodiment of the present application.

Furthermore, referring to FIG. 5, in an embodiment, the detecting whether the target object is in the sound-producing state in step A202 includes:

Step A2021, obtaining lip data of the target object obtained by analyzing the image data, and the lip data includes lip contour data and lip opening degree and closing degree data.

In this embodiment, detecting the lip data of the target object to determine whether the target object is in a sound-producing state.

Specifically, in this embodiment, obtaining the lip data of the target object is obtained by analyzing the image data by the headphone device, and the lip data includes the lip contour data and the lip opening and closing degree data of the target object. The process of obtaining the lip data of the target object can be: using face recognition technology to detect the positions of the upper lip valley, the middle point of the lower lip edge and the lip corners on both sides of the target object in the image data. Calculating the straight-line distance between the upper lip valley of the target object and the middle point of the lower lip edge of the target object, and the straight-line distance between the lip corners on both sides of the target object, and obtaining the lip contour data of the target object. Taking the line segment formed by the upper lip valley of the target object and the left lip corner of the target object as the first line segment, and taking the line segment formed by the middle point of the lower lip edge and the left lip corner as the second line segment, and calculating the angle data of the angle formed by the first line segment, the second line segment and the left lip corner to obtain the lip opening and closing degree data of the target object. Furthermore, in another embodiment, the angle data of the angle with the right lip angle as the vertex can also be calculated to obtain the lip opening degree and closing degree data, which is not limited here.

Step A2022, comparing the lip data with preset reference data; the reference data includes lip contour data of a person when not in the sound-producing state, and lip opening degree and closing degree data of the person when not in the sound-producing state.

The lip contour data of the person when not in the sound-producing state and the lip opening degree and closing degree data of the person when not in the sound-producing state are pre-set in the headphone device, hereinafter referred to as the reference data for distinction.

In an embodiment, the reference data may be obtained by detecting in the laboratory. Detecting the reference data in the laboratory may be detecting the lip contour data of any one person and the lip opening degree and closing degree data of any one person, or may be detecting the average lip contour data of multiple people and the average lip opening degree and closing degree data of multiple people. The specific detection method may refer to the process of obtaining the lip data of the target object in step A2021, or may be directly measuring the lips of the person. In another embodiment, the reference data may also be the lip contour data and lip opening degree and closing degree data set according to user needs, which are not specifically limited here.

Comparing the obtained lip data with the preset reference data, that is, comparing the lip contour data of the target object with the lip contour data in the reference data, and comparing the lip opening degree and closing degree data of the target object with the lip opening degree and closing degree data in the reference data.

Step A2023, in response to determining that the lip data is inconsistent with the reference data, determining that the target object is in the sound-producing state.

When the headphone device determines that the lip data of the target object is inconsistent with the preset reference data, it can be determined that the target object is in the sound-producing state. At this time, it can be determined that the external environment meets the first target condition, and the headphone device turns on the transparent mode.

Furthermore, in another embodiment, it is also possible to refer to the existing facial recognition technology to detect whether the target object is in the sound-producing state.

Furthermore, in an embodiment, the target state can be that the target object is in the approaching state. In this embodiment, the distance between the target object and the user can be obtained by analyzing the image data according to the image distance measurement principle. A distance range centered on the user (hereinafter referred to as the preset distance range for distinction) is pre-set in the headphone device. The preset distance range can be a distance range set on the headphone device when it leaves the factory, or a distance range set according to user needs, and there is no specific limitation. When the distance between the target object and the user is within the preset distance range, determining that the target object is in an approaching state, and at this time, it can be determined that the external environment meets the first target condition, and the headphone device turns on the transparent mode.

Furthermore, in another embodiment, the target state can be that the target object is in a moving state. When the target object is in a moving state, it can be determined that the external environment meets the first target condition, and the headphone device turns on the transparent mode. In a specific embodiment, detecting whether the target object is in a moving state can be determined by detecting whether the position of the target object in different image data changes, or can be determined by referring to the existing object movement recognition technology, and there is no specific limitation in this embodiment.

In this embodiment, the headphone device detects whether the external environment meets the first target condition by analyzing the received image data; when determining that the external environment meets the first target condition, the headphone device turns on the transparent mode, thus realizing that enabling the user to hear the sound of the external environment in the case of using the headphone device and the head-mounted device normally, and improving the comfort and convenience of the user when using the head-mounted device.

Figure 6:
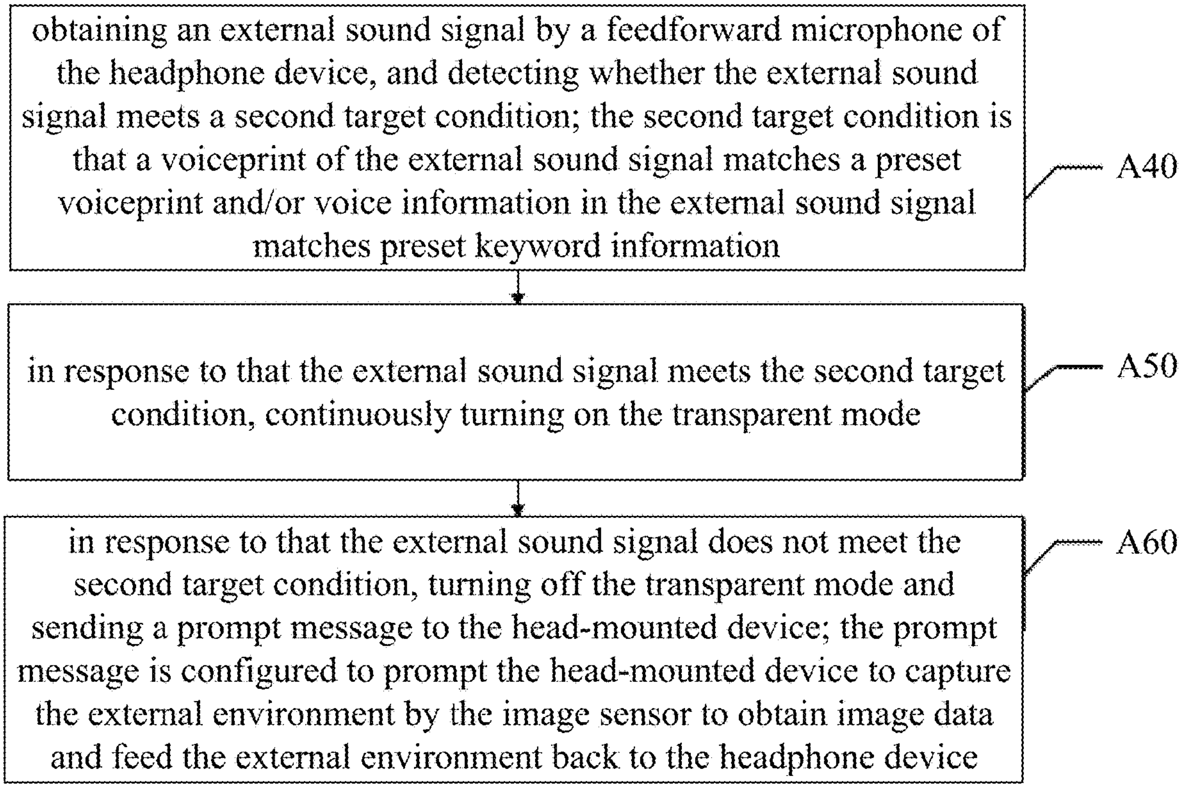
FIG. 6 is a flowchart of a method for controlling a headphone mode according to an embodiment of the present application.

Furthermore, referring to FIG. 6, based on the above embodiment, another embodiment of the method for controlling the headphone mode of the present application is proposed. In this embodiment, after the step A30, the method further includes:

Step A40, obtaining an external sound signal by a feedforward microphone of the headphone device, and detecting whether the external sound signal meets a second target condition; the second target condition is that a voiceprint of the external sound signal matches a preset voiceprint and/or voice information in the external sound signal matches preset keyword information.

After the headphone device turns on the transparent mode, determining whether to continue to turn on the transparent mode by detecting whether the external sound meets the preset second target condition. When the transparent mode is turned on continuously, the user can continuously hear the sound of the external environment for a certain duration, so as to avoid the user missing important information due to frequent mode switching, thus improving the comfort and convenience of the user using the head-mounted device.

Specifically, in this embodiment, the condition for continuously turning on the transparent mode is pre-set in the headphone device, which is hereinafter referred to as the second target condition for distinction. Obtaining the external sound signal by a feedforward microphone of the headphone device, and detecting the external sound signal to determine whether the external sound signal meets the second target condition. The second target condition may be that the voiceprint of the external sound signal matches the preset voiceprint and/or the voice information in the external sound signal matches preset keyword information.

The process of detecting whether the external sound signal meets the second target condition may be: determining whether the voiceprint contained in the external sound signal matches the preset voiceprint by voiceprint recognition technology; and determining whether the voice information in the external sound signal matches the preset keyword information by voice technology.

The detection of the headphone device that whether the transparent mode is continuously turned on may be performed immediately after the transparent mode is turned on, or may be performed after the transparent mode is turned on for a certain duration, and there is no specific limitation in this embodiment.

The specific process of setting the second target condition on the headphone device may be: recording the user's voice or the voice of others required by the user in advance in the headphone device, and extracting the voiceprint of the pre-recorded voice (hereinafter referred to as the preset voiceprint for distinction). Presetting keywords in the headphone device, and the preset keywords can be keywords set in the headphone device at the factory, such as greetings such as "hello", or keywords set in the headphone device by the user according to his own needs or habits, and there is no specific limitation in this embodiment.

Step A50: in response to that the external sound signal meets the second target condition, continuously turning on the transparent mode.

When determining that the voiceprint contained in the external sound signal matches the preset voiceprint, and the voice information contained in the external sound signal matches the preset keyword information, it can be determined that the external sound signal meets the preset second target condition, and the headphone device continuously turns on the transparent mode.

Step A60, in response to that the external sound signal does not meet the second target condition, turning off the transparent mode and sending a prompt message to the head-mounted device; the prompt message is configured to prompt the head-mounted device to capture the external environment by the image sensor to obtain image data and feed the external environment back to the headphone device.

When determining that the voiceprint contained in the external sound signal does not match the preset voiceprint, or the voice information contained in the external sound signal does not match the preset keyword information, it can be determined that the external sound signal does not meet the preset second target condition, and the headphone device turns off the transparent mode.

After the headphone device turns off the transparent mode, it sends a prompt message to the head-mounted device to prompt the head-mounted device to capture the external environment by the image sensor to obtain image data, so as to feed the image data back to the headphone device so that the headphone device detect the external environment.

It should be noted that by continuously turning on the transparent mode, the time for the headphone device to turn on and off the transparent mode can be reduced, ensuring that the user can continue to hear the sound of the external environment for a certain duration, reducing the possibility that the user may miss the sound of the external environment, and improving the comfort and convenience of the user using the head-mounted device.

Figure 7:
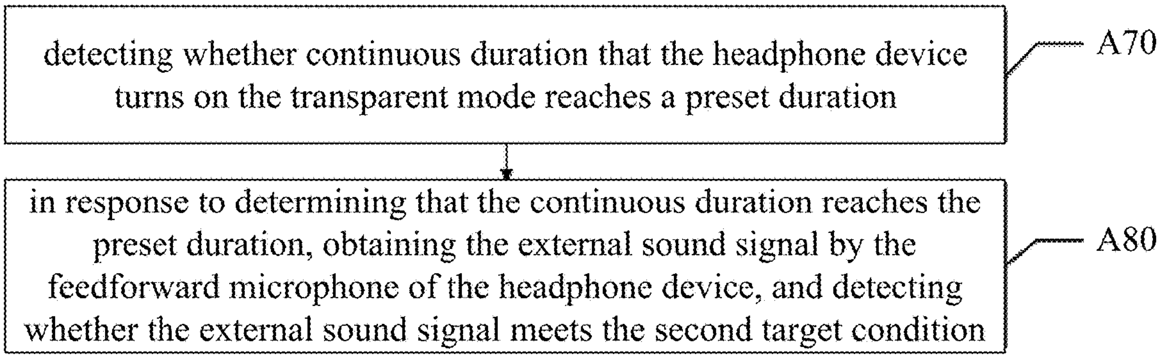
FIG. 7 is a flowchart of a method for controlling a headphone mode according to an embodiment of the present application.

Furthermore, referring to FIG. 7, in an embodiment, after step A60, the method further includes:

Step A70, detecting whether continuous duration that the headphone device turns on the transparent mode reaches a preset duration; and Step A80, in response to determining that the continuous duration reaches the preset duration, obtaining the external sound signal by the feedforward microphone of the headphone device, and detecting whether the external sound signal meets the second target condition.

When the headphone device continuously turns on the transparent mode for a certain duration, detecting the external sound signal again to determine whether the transparent mode needs to be continuously turned on.

Specifically, in this embodiment, a certain duration (hereinafter referred to as preset duration for distinction) is preset in the headphone device. The preset duration may be the duration set in the headphone device at the factory, or may be the duration set according to the user's own needs or conversation habits, which is not limited in this embodiment.

The headphone device obtains the duration of turning on the transparent mode (hereinafter referred to as continuous duration for distinction), and detects whether the continuous duration reaches the preset duration. When the continuous duration reaches the preset duration, detecting the external sound signal to determine whether to continue turning on the transparent mode.

In this embodiment, by intelligently controlling the time to turn on the transparent mode, the possibility of the user missing the sounds of the external environment is reduced, thereby improving the convenience of the user in using the head-mounted device. At the same time, it is avoided that the headphone device always turns on the transparent mode, so that the user can use the head-mounted device for entertainment or work, thereby improving the comfort of the user in using the head-mounted device.

Figure 2:
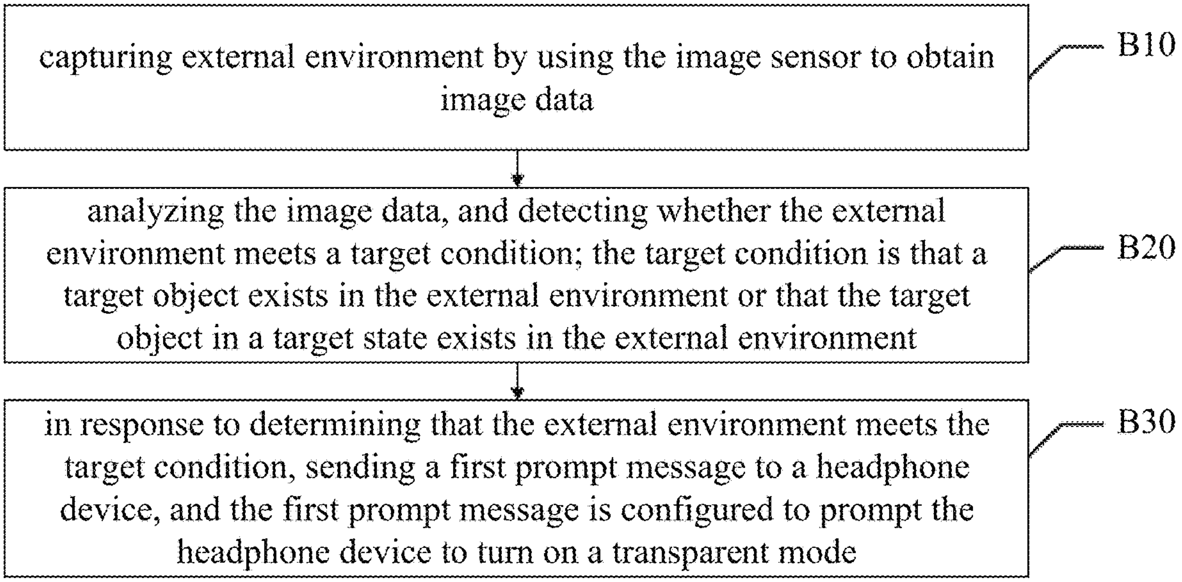
FIG. 2 is a flowchart of a method for controlling a headphone mode according to an embodiment of the present application.

Furthermore, based on the above embodiments, another embodiment of the method for controlling the headphone mode of the present application is proposed. The method for controlling the headphone mode of the embodiment of the present application is applied to a head-mounted device, the head-mounted device is a head-mounted display, and the head-mounted display can be a head-mounted device, an augmented reality device, a mixed reality device, etc., which is not specifically limited in this embodiment. In this embodiment, referring to FIG. 2, the method for controlling the headphone mode includes:

Step B10, capturing external environment by using the image sensor to obtain image data.

Step B20, analyzing the image data, and detecting whether the external environment meets a target condition; the target condition is that a target object exists in the external environment or that the target object in a target state exists in the external environment.

Step B30, in response to determining that the external environment meets the target condition, sending a first prompt message to a headphone device, and the first prompt message is configured to prompt the headphone device to turn on a transparent mode.

In this embodiment, the head-mounted device is provided with an image sensor that can capture the external environment. The image sensor provided on the head-mounted device can be a camera or other device that can capture the external environment to obtain image data, which is no specific limitation here. The number of image sensors set on the head-mounted device is not limited in this embodiment, and can be set according to actual needs. The orientation of the image sensor set on the head-mounted device can be directly in front of the head-mounted device, or can be on the side of the head-mounted device, and the specific setting position is not limited in this embodiment.

Specifically, in this embodiment, the head-mounted device captures the external environment by the image sensor to obtain image data, and the head-mounted device detects the image data to obtain the detection result, and then sends a prompt message to the headphone device to prompt the headphone device to turn on the transparent mode.

The head-mounted device analyzes the image data obtained by taking the photograph, and detects whether the external environment meets the preset target condition. The target condition may be that a target object exists in the external environment, or may be that a target object in a target state exists in the external environment, and the specific embodiment is not limited thereto.

When detecting that the external environment meets the target condition, the head-mounted device sends a prompt message (hereinafter referred to as the first prompt message for distinction) to the headphone device. In an embodiment, the first prompt message sent by the head-mounted device may be the detection result information of the external environment meeting the target condition obtained by the head-mounted device after detecting the external environment, so that the headphone device can determine to turn on the transparent mode. In another embodiment, the first prompt message may also be instruction information generated by the head-mounted device according to the detection result information to remind the headphone device to turn on the transparent mode, which is not limited in this embodiment.

The specific implementation of detecting whether the external environment meets the target condition can refer to the specific implementation of the above embodiments, which will not be repeated here.

Furthermore, in another embodiment, the external environment does not meet the target condition, and the head-mounted device does not send the first prompt message to the headphone device.

Figure 8:
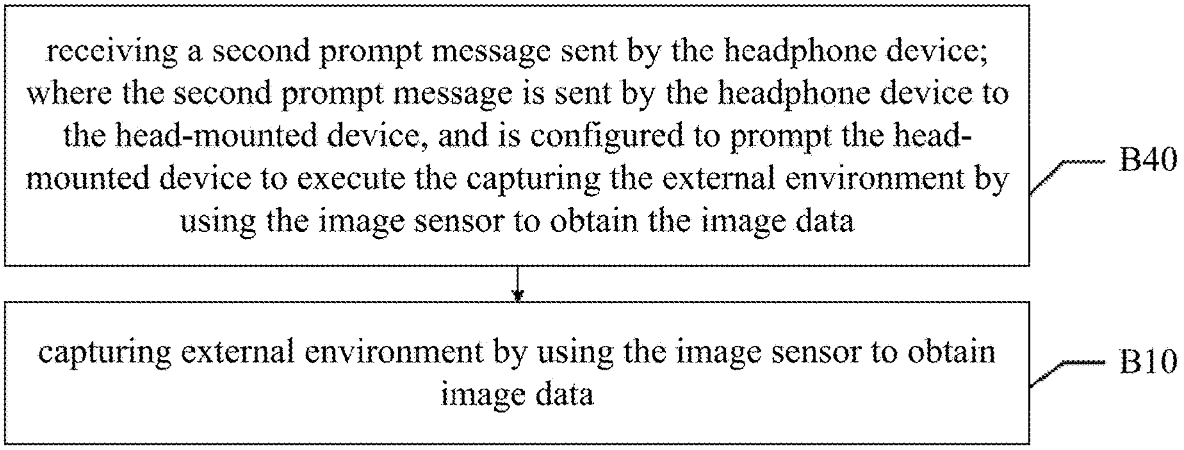
FIG. 8 is a flowchart of a method for controlling a headphone mode according to an embodiment of the present application.

Furthermore, referring to FIG. 8, in an embodiment, before step B10, the method further includes:

Step B40, receiving a second prompt message sent by the headphone device; where the second prompt message is sent by the headphone device to the head-mounted device, and is configured to prompt the head-mounted device to execute the capturing the external environment by using the image sensor to obtain the image data.

The headphone device can send a prompt message (hereinafter referred to as the second message for distinction) to the head-mounted device after turning off the transparent mode. After the head-mounted device receives the second prompt message sent by the headphone device, obtaining the image data by capturing the external environment by the image sensor.

After the head-mounted device obtains the image data, it can refer to step B10 to step B30 in the above embodiment: analyzing the image data, and detecting whether the external environment meets a target condition; in response to that the external environment meets the target condition, sending the first prompt message to the headphone device, so as to prompt the headphone device to turn on the transparent mode.

It should be noted that the head-mounted device analyzes the image data, and when detecting that the external environment meets the target condition, sends a first prompt message to the headphone device, thereby realizing intelligent control of the transparent mode of the headphone device to turn on, so that the user can hear the sound of the external environment when using the headphone device and the head-mounted device normally, thus improving the comfort and convenience of the user when using the head-mounted device.

Figure 3:
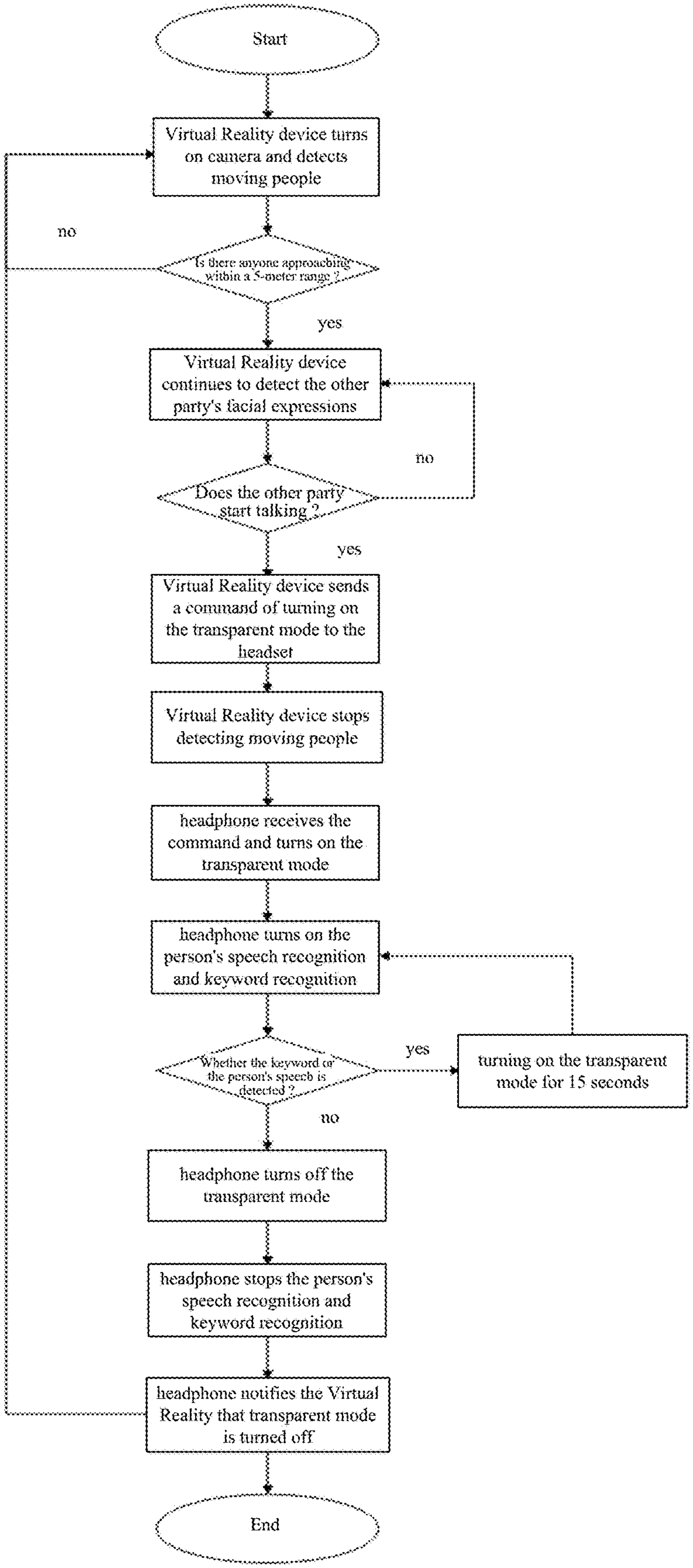
FIG. 3 is a flowchart of a method for controlling a headphone mode according to an embodiment of the present application.

Furthermore, in an embodiment, a target object in a target state is set in the external environment, the target object is a person in the external environment, and the target state is that the target object is in an approaching state, a moving state, and a sound-producing state. Referring to FIG. 3, in a specific implementation, the head-mounted device captures the external environment by a camera to detect whether there is a moving person (that is, a target object in a moving state) in the external environment. When the head-mounted device detects that the moving person does not appear within a 5-meter range (that is, a preset distance range) of the user, the head-mounted device continuously scans the external environment to detect whether there is a moving person in the external environment. When the head-mounted device detects that someone moves within a 5-meter range of the user (that is, there is a target object in an approaching state exists in the external environment), the head-mounted device performs facial recognition on the person who moves within a 5-meter range of the user to determine whether the other party speaks. When a person who moves within the 5-meter range of the user does not speak, detecting the other party's facial expression continuously to determine whether the other party will speak subsequently. When a person who moves within 5-meter range of the user speaks (that is, a target object in a sound-producing state exists in the external environment), sending a command (that is, a first prompt message) to the headphone device by the head-mounted device to prompt the headphone device to turn on the transparent mode; at this time, the head-mounted device stops detecting whether a moving person exists in the external environment.

After the headphone device receives the prompt message sent by the head-mounted device, the headphone device turns on the transparent mode. After the headphone device turns on the transparent mode, obtaining the external sound signal by the feedforward microphone to identify whether the user is speaking and keyword recognition (that is, to detect whether the external sound signal meets the second target condition). When the headphone device does not detect the user himself/herself speaking or the keyword, the headphone device turns off the transparent mode; at this time, the headphone device stops identifying whether the user is speaking and keyword recognition, and the headphone device prompts the head-mounted device that the transparent mode has been turned off (that is, the headphone device sends a second prompt message to the head-mounted device), so as to prompt the head-mounted device to scan the external environment by the camera. When the headphone device detects the user himself/herself speaking or the keyword, the turning on the transparent mode for 15 seconds (that is, the continuous duration). After the transparent mode is turned on for 15 seconds, the headphone device obtains the external sound signal again to identify whether the user himself/herself speaks and whether there are keywords.

In this embodiment, the head-mounted device captures the external environment by the image sensor to obtain image data, analyzes the image data, and detects whether the external environment meets the target condition; when determining that the external environment meets the target condition, sends a first prompt message to the headphone device to prompt the headphone device to turn on the transparent mode, thereby realizing the intelligent control of the transparent mode of the headphone device turning on, so that the user can hear the sound of the external environment when using the head-mounted device, and improving the comfort and convenience of the user when using the head-mounted device.

In addition, the embodiment of the present application further proposes a headphone device, the headphone device includes a structural shell, a communication module, a main control module (such as a Microcontroller Unit, MCU), a speaker, a feedforward microphone, a memory, etc. The main control module may include a microprocessor, an audio decoding unit, an image decoding unit, a power supply and a power management unit, sensors and other active components or passive components (which may be replaced, deleted or added according to actual functions) required by the system to realize the image receiving and analyzing functions. The headphone device may establish a communication connection with a head-mounted device or other user terminals by the communication module. The memory of the headphone device may store a program for controlling a headphone mode, and the microprocessor may be configured to call the program for controlling the headphone mode stored in the memory, and perform the following operations:

receiving image data sent by a head-mounted device, and the head-mounted device is configured to obtain the image data by capturing external environment by an image sensor on the head-mounted device;

analyzing the image data, and detecting whether the external environment meets a first target condition; and the first target condition is that a target object exists in the external environment or that the target object in a target state exists in the external environment; and in response to determining that the external environment meets the first target condition, turning on a transparent mode.

Furthermore, in response to that the first target condition is that the target object in the target state exists in the external environment, and the target object is a person, the operation of the analyzing the image data, and detecting whether the external environment meets the first target condition includes:

analyzing the image data, and detecting whether the target object exists in the external environment;

in response to determining that the target object exists in the external environment, detecting whether the target object is in the target state; the target state includes an approaching state, a moving state and/or a sound-producing state, and the approaching state is a state in which a distance between the target object and an user is within a preset distance range; and in response to determining that the target object is in the target state, determining that the external environment meets the first target condition.

Furthermore, the operation of the detecting whether the target object is in the sound-producing state includes:

obtaining lip data of the target object obtained by analyzing the image data, and the lip data includes lip contour data and lip opening degree and closing degree data;

comparing the lip data with preset reference data; the reference data includes lip contour data of a person when not in the sound-producing state, and lip opening degree and closing degree data of the person when not in the sound-producing state; and in response to determining that the lip data is inconsistent with the reference data, determining that the target object is in the sound-producing state.

Furthermore, after the operation of the in response to determining that the external environment meets the first target condition, turning on the transparent mode, the microprocessor can further be configured to call the sound signal processing program stored in the memory to perform the following operations:

obtaining an external sound signal by a feedforward microphone of the headphone device, and detecting whether the external sound signal meets a second target condition; the second target condition is that a voiceprint of the external sound signal matches a preset voiceprint and/or voice information in the external sound signal matches preset keyword information;

in response to that the external sound signal meets the second target condition, continuously turning on the transparent mode; and in response to that the external sound signal does not meet the second target condition, turning off the transparent mode and sending a prompt message to the head-mounted device; and the prompt message is configured to prompt the head-mounted device to capture the external environment by the image sensor to obtain image data and feed the external environment back to the headphone device.

Furthermore, after the operation of the in response to that the external sound signal meets the second target condition, continuously turning on the transparent mode, the microprocessor can further be configured to call the sound signal processing program stored in the memory to perform the following operations:

detecting whether continuous duration that the headphone device turns on the transparent mode reaches a preset duration; and in response to determining that the continuous duration reaches the preset duration, obtaining the external sound signal by the feedforward microphone of the headphone device, and detecting whether the external sound signal meets the second target condition.

The various embodiments of the headphone device of the present application can refer to the above embodiments of the method for controlling the headphone mode of the present application, which will not be repeated here.

In addition, the embodiment of the present application further proposes a head-mounted device, the head-mounted device includes a structural shell, a communication module, a main control module (such as a Microcontroller Unit, MCU), a memory, an image sensor, etc. The main control module may include a microprocessor, an image decoding unit, a power supply and a power management unit, sensors and other active components or passive components (which may be replaced, deleted or added according to actual functions) required by the system to realize the image receiving, sending and analyzing functions. The head-mounted device may establish a communication connection with a headphone device or other user terminals by the communication module. The memory of the head-mounted device may store a program for controlling a headphone mode, and the microprocessor may be configured to call the program for controlling a headphone mode stored in the memory, and perform the following operations:

capturing external environment by using the image sensor to obtain image data;

analyzing the image data, and detecting whether the external environment meets a target condition; the target condition is that a target object exists in the external environment or that the target object in a target state exists in the external environment; and in response to determining that the external environment meets the target condition, sending a first prompt message to a headphone device, and the first prompt message is configured to prompt the headphone device to turn on a transparent mode.

Furthermore, before the capturing the external environment by using the image sensor to obtain the image data, the microprocessor can further be configured to call the program for controlling the headphone mode stored in the memory and perform the following operations:

receiving a second prompt message sent by the headphone device; the second prompt message is sent by the headphone device to the head-mounted device, and is configured to prompt the head-mounted device to execute the using, by the head-mounted device, the image sensor to capture the external environment to obtain the image data.

The various embodiments of the head-mounted device of the present application can refer to the above embodiment of the method for controlling the headphone mode of the present application, and will not be repeated here.

In addition, the embodiment of the present application further proposes a computer-readable storage medium, the storage medium stores a program for controlling a headphone mode, and the steps of the program for controlling the headphone mode implements the method for controlling the headphone mode described above when executed by a processor.

The various embodiments of the computer-readable storage medium of the present application can refer to the various embodiments of the method for controlling the headphone mode of the present application, and will not be repeated here.

In the present application, the terms "comprise", "include" or any other variation thereof are intended to cover a non-exclusive inclusion, such that a process, method, article or system that includes a list of elements not only includes those elements, but also includes other elements not expressly listed, or also includes elements inherent to the process, method, article or system. In a case of without further restrictions, an element defined by the statement "includes . . . " does not exclude the existence of other identical elements in a process, method, article or system that includes this element.

The serial numbers of the embodiments of the present application mentioned above are only for description and do not represent the advantages and disadvantages of the embodiments.

By the description of the above implementation methods, those skilled in the art can clearly understand that the above implementation methods can be implemented by means of software plus a necessary general hardware platform, or by hardware, but in many cases the former is a better implementation method. Based on this understanding, the technical solution of the present application, or the part that contributes to the prior art, can be embodied in the form of a software product, which is stored in a storage medium (such as ROM/RAM (that is, Read-Only Memory/Random Access Memory), disk, optical disk) as described above, and includes several instructions for a terminal device (which can be a mobile phone, computer, server, or network device, etc.) to execute the methods described in each embodiment of the present application.

The above are only some embodiments of the present application, and do not limit the scope of the present application. Any equivalent structure or equivalent process transformation made by using the contents of the description and accompanying drawings of the present application, or directly or indirectly applied in other related technical fields, are also included in the scope of the present application.

What is claimed is:

1. A method for controlling a headphone mode, applied to a headphone device, comprising:

receiving image data sent by a head-mounted device, wherein the head-mounted device is configured to obtain the image data by capturing external environment by an image sensor on the head-mounted device;

analyzing the image data, and detecting whether the external environment meets a first target condition; wherein the first target condition is that a target object exists in the external environment or that the target object in a target state exists in the external environment; and in response to determining that the external environment meets the first target condition, turning on a transparent mode;

wherein after the in response to determining that the external environment meets the first target condition, turning on the transparent mode, the method further comprises:

obtaining an external sound signal by a feedforward microphone of the headphone device, and detecting whether the external sound signal meets a second target condition; wherein the second target condition is that a voiceprint of the external sound signal matches a preset voiceprint and/or voice information in the external sound signal matches preset keyword information;

in response to that the external sound signal meets the second target condition, continuously turning on the transparent mode; and in response to that the external sound signal does not meet the second target condition, turning off the transparent mode and sending a prompt message to the head-mounted device; wherein the prompt message is configured to prompt the head-mounted device to capture the external environment by the image sensor to obtain image data and feed the external environment back to the headphone device.

2. The method according to claim 1, wherein in response to that the first target condition is that the target object in the target state exists in the external environment, and the target object is a person, the analyzing the image data, and detecting whether the external environment meets the first target condition comprises:

analyzing the image data, and detecting whether the target object exists in the external environment;

in response to determining that the target object exists in the external environment, detecting whether the target object is in the target state; wherein the target state comprises an approaching state, a moving state and/or a sound-producing state, and the approaching state is a state in which a distance between the target object and a user is within a preset distance range; and in response to determining that the target object is in the target state, determining that the external environment meets the first target condition.

3. The method according to claim 2, wherein the detecting whether the target object is in the sound-producing state comprises:

obtaining lip data of the target object obtained by analyzing the image data, wherein the lip data comprises lip contour data and lip opening degree and closing degree data;

comparing the lip data with preset reference data; wherein the reference data comprises lip contour data of a person when not in the sound-producing state, and lip opening degree and closing degree data of the person when not in the sound-producing state; and in response to determining that the lip data is inconsistent with the reference data, determining that the target object is in the sound-producing state.

4. The method according to claim 1, wherein after the in response to that the external sound signal meets the second target condition, continuously turning on the transparent mode, the method further comprises:

detecting whether continuous duration that the headphone device turns on the transparent mode reaches a preset duration; and in response to determining that the continuous duration reaches the preset duration, obtaining the external sound signal by the feedforward microphone of the headphone device, and detecting whether the external sound signal meets the second target condition.

5. A headphone device, comprising:

a memory;

a processor; and a program for controlling a headphone mode stored in the memory and executable on the processor;

wherein the program for controlling the headphone mode is configured to implement the method for controlling the headphone mode according to claim 1.

6. A non-transitory computer-readable storage medium, wherein the non-transitory computer-readable storage medium stores a program for controlling a headphone mode, and the program for controlling the headphone mode implements the method for controlling the headphone mode according to claim 1 when executed by a processor.

* * * * *